(12) United States Patent
Cheng et al.

(10) Patent No.: US 7,110,938 B1
(45) Date of Patent: Sep. 19, 2006

(54) E-SERVICES TRANSLATION PORTAL SYSTEM

(75) Inventors: Shang-Che Cheng, Saratoga, CA (US); Alexander Pressman, Saratoga, CA (US); Hong Zhang, Cupertino, CA (US); Pei Chiang Ma, Sunnyvale, CA (US); Shuan Zhang, Foster City, CA (US)

(73) Assignee: Trados, Inc., Sunnyvale, CA (US)

( * ) Notice: Subject to any disclaimer, the term of this patent is extended or adjusted under 35 U.S.C. 154(b) by 788 days.

(21) Appl. No.: 09/662,758

(22) Filed: Sep. 15, 2000

(51) Int. Cl.
*G06F 17/28* (2006.01)

(52) U.S. Cl. .................................. 704/5; 704/2; 704/7
(58) Field of Classification Search ..................... 704/2, 704/5, 3, 4
See application file for complete search history.

(56) References Cited

U.S. PATENT DOCUMENTS

| | | | | |
|---|---|---|---|---|
| 5,075,850 A | * | 12/1991 | Asahioka et al. ............... 704/2 |
| 5,140,522 A | * | 8/1992 | Ito et al. ......................... 704/2 |
| 5,295,068 A | * | 3/1994 | Nishino et al. ................ 704/10 |
| 5,477,451 A | * | 12/1995 | Brown et al. .................... 704/9 |
| 5,497,319 A | * | 3/1996 | Chong et al. .................... 704/2 |
| 5,644,775 A | * | 7/1997 | Thompson et al. ............. 704/7 |
| 5,751,957 A | * | 5/1998 | Hiroya et al. ................ 709/203 |
| 5,884,246 A | * | 3/1999 | Boucher et al. ................ 704/2 |
| 5,895,446 A | * | 4/1999 | Takeda et al. .................. 704/2 |
| 5,966,685 A | * | 10/1999 | Flanagan et al. ............... 704/8 |
| 5,987,401 A | * | 11/1999 | Trudeau ......................... 702/2 |
| 6,092,035 A | * | 7/2000 | Kurachi et al. ................. 704/3 |
| 6,161,082 A | * | 12/2000 | Goldberg et al. .............. 704/3 |
| 6,278,969 B1 | * | 8/2001 | King et al. ..................... 704/7 |
| 6,338,033 B1 | * | 1/2002 | Bourbonnais et al. ......... 704/3 |
| 6,345,244 B1 | * | 2/2002 | Clark ............................ 704/2 |
| 6,347,316 B1 | * | 2/2002 | Redpath ...................... 707/10 |
| 6,401,105 B1 | * | 6/2002 | Carlin et al. ................. 715/512 |
| 6,526,426 B1 | * | 2/2003 | Lakritz ....................... 715/536 |

* cited by examiner

*Primary Examiner*—David Hudspeth
*Assistant Examiner*—Matthew J. Sked
(74) *Attorney, Agent, or Firm*—Banner & Witcoff Ltd.

(57) ABSTRACT

A portal for translating data is provided wherein users upload text to be translated. The text may be in the form of Web pages, in the form of hypertext mark-up language (HTML) files, or other formats. The portal at least partially translates the data and facilitates the selection of a vendor or vendors to complete the translation process. The portal makes use of a database containing previously completed translations, which database is utilized to at least partially translate new requests for translations, and thereby reduces the workload of the vendors selected to complete the process.

18 Claims, 14 Drawing Sheets

E-SERVICES TRANSLATION PORTAL SYSTEM

BACKGROUND OF THE INVENTION

1. Field of the Invention

The present invention is directed to a translation portal for at least partially translating data and facilitating the completion of the translation process. More in particular, the present invention is directed to a system for translating data which includes a source of data to be translated, a network connected to the source of data, a translation source connected to the network, and a portal system connected to the network for retrieving the data to be translated, and at least partially translating that data. Still further, the portal system includes a system for transmitting the at least partially translated data to the translation source for completing the translation of the data. Still further, the portal system includes a file storage memory for storing the data to be translated and a database for storing therein previously entered data to be translated associated with prior translations thereof.

2. Prior Art

Currently, there exists individual translation memory tools for use on a translator's workstation. Such translation aids analyze documents on a word-by-word basis, treating each new document as a totally new project. Such systems suffer from reduced efficiency in that they fail to take into account redundancies found in a document, similarities of one document to a previously translated document, and provide no means to enable team collaboration or involve the customer in the translation process.

There is therefore a need to provide a centralized translation database from which prior translations can be utilized to at least partially translated new documents to be translated. There is further a need to involve the translation customer in an iterative process, with intermediate approvals of translation work being obtained as a translation project progresses.

In an era where businesses are able to take advantage of a world wide marketplace utilizing a global computer network (Internet) it is important that such businesses are able to easily solicit business in multiple languages. Therefore, many businesses desire to have their Web pages translated into multiple languages, so that they are able to solicit business in many different markets. Therefore, a system which can upload a Web page and duplicate it in multiple languages is highly desirable. Further, as much multiple languages is highly desirable. Further, as much of the language of any one Web page is similar to that of other Web pages, it is further desirable to make use of the translations of previously translated Web pages to aid in the translation of other Web pages. By such an arrangement, the present invention reduces the workload of translators, whether it is translation of Web pages or other documents.

SUMMARY OF THE INVENTION

A system for translating data is provided. The translating system includes a source of data to be translated, and a network connected to the source of data. The system further includes a translation source connected to the network and a portal system connected to the network for retrieving the data to be translated. The portal system includes a system for at least partially translating the data and a system for transmitting the at least partially translated data to the translation source for completing the translation of the data.

From another aspect, a system for translating data transmitted electronically through a global computer network is provided. The system includes at least one user terminal coupled to the global computer network for transmitting and receiving user related data therethrough. The system also includes at least one vendor terminal coupled to the global computer network for transmitting and receiving vendor related data therethrough. The system includes a first computer coupled to the global computer network for exchanging user related data with the at least one user terminal and vendor related data with the at least one vendor terminal through the global computer network. A file storage memory is provided which is coupled to the first computer for storing user related current document data representing documents to be transmitted from the at least one user terminal. A second computer is provided that is coupled to the first computer and the file storage memory for at least partially translating the current document data. The system also includes a database of previously entered document data and associated translated document data coupled to the second computer. The second computer compares the current document data with the previously entered document data to match the current document data with corresponding translated document data in the database to form the at least partial translation of the current document data. The at least partial translation is sent to the first computer and transmitted therefrom to the at least one vendor terminal for completing translation of the current document data and uploading the completed translation to the first computer. The first computer includes a system for transmitting the completed translation to the at least one user terminal and the second computer. The second computer includes a system for adding the current document data and the completed translation to the database.

DETAILED DESCRIPTION OF THE PREFERRED EMBODIMENT

Figure 1:
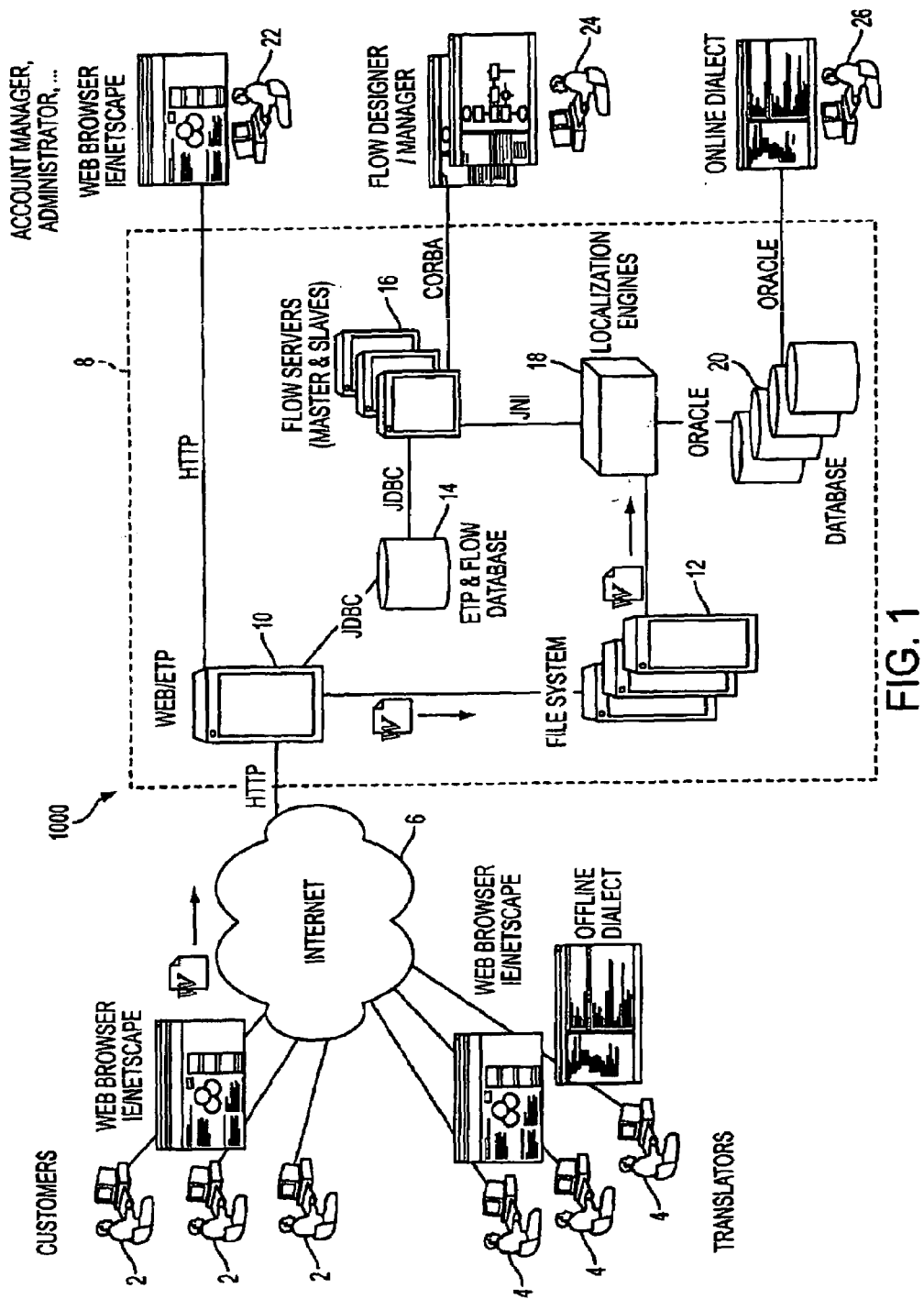
FIG. 1 is an architectural overview diagram of the present invention.

The present invention is directed to a language translation system implemented as a portal on a global computer/communications network and combines advanced translation technologies with human translators for carrying out cost-efficient multilingual electronic commerce initiatives.

In FIGS. 1–4, system 1000 is illustrated. System 1000 provides a language portal implemented on the Internet. A plurality of customers 2 access the translation server network 8 through the global computer network (Internet) 6. As will be described further in following paragraphs, documents submitted by customers 2 to the translation server network 8 are translated at least partially automatically by the localization engines 18 utilizing the multilingual translation database 20, by offline translators 4 and/or online translators 26, through an intranet network.

Looking at the operation of system 1000, one or more users 2, using a Web browser or like type software access the Web server 10 through the global computer network 6. The E-services Translation Portal (ETP) 10 allows users 2 to establish translation projects and store ETP and flow data in the flow database 14 for establishing a workflow for the customer's documents to be translated, also providing reports to the administrator 22 and the flow designer 24. As the number of customers increases, additional servers 16 are brought online. Customer documents to be translated are stored in the file system memory 12. The documents stored in file system storage 12 are subsequently processed by localization engines 18 wherein the documents are identified as to file type, i.e. HTML, GIF, any one of a multiplicity of word processor, text, or spreadsheet file types. Next, the file is separated into translatable and non-translatable strings and stored in the translation database 20. Once the translatable strings of the file have been identified, they are then compared with previously translated strings to find similar strings which have already been translated. If a string matches more than one previously translated string, the customer's string to be translated at this time will be matched with the prior translation which has the highest frequency of use, or from the latest or user specified single or multiple previous translation versions. The partially translated document is also stored in the translation database 20.

The translation of the partially translated document is then completed by an online translator 26, or an offline translator 4, in accordance with the workflow design established for the particular customer 2. The workflow design may specify a particular translator 4, 26 that the customer 2 has engaged. The vendor (translator) assigns a price per unit for its work. This unit can be based on the number of words to be translated, a number of hours, etc. The customer selects a vendor based on a number of criteria including, but not limited to, resumes, references, customer ratings, volume, location, expertise and the like, which information is transferred to the customer 2 by the server 10.

Customers submit projects through the Internet to the translation server network, where the Web server/ETP 10 and database 14 are utilized to provide a measurement of the project. The size of the project is automatically estimated and broken down by some number of units. Then, based on the number of units and the vendor's cost per unit, a quote is provided to the customer through the server 10, which can also include a schedule and incremental costs. Alternately, the project may be entered for bid, where the customer submits its project to a selected list of vendors from which quotes are received.

After the customer receives and approves a quote, the customer transmits a contract to the vendor to perform the work. The selected vendor then executes the contract electronically to accept the project. The fact that the vendor receives the project from the translation server network 8, partially translated, reduces the costs of translation services. The customer, using their connection to the translation server network 8 through the Internet, can track the progress of the project, conduct interim reviews, provide interim approvals and, through the use of log files, has access to an audit trail.

Figure 2:
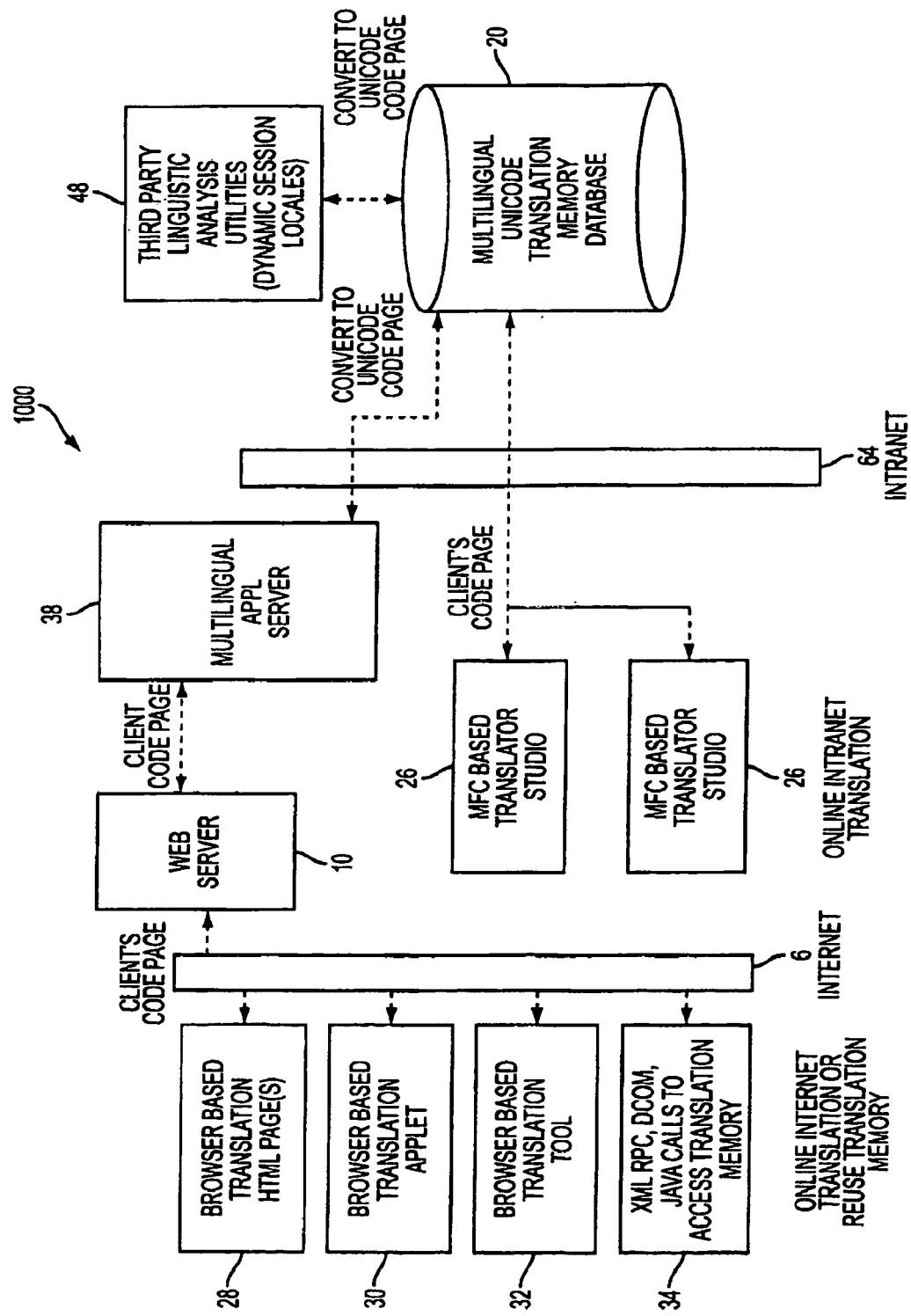
FIG. 2 is a block diagram illustrating the present invention.

Turning now to FIG. 2, such shows system 1000 from another perspective. Access to Web server/ETP 10 through the network 6 is accomplished by customers utilizing browsers for submitting translation jobs as part of HTML pages 28. Vendors access the documents to be translated through browser based tools 30, 32 and 34. Web server/ETP 10 communicates with the multilingual application server 38, the server 10 receiving the files and transmitting the files to the customer, while the application server 38 creates the projects, creates orders, checks for the translatable strings and stores them in the translation database 20. The application server 38 embodies servers 16, database 14, localization engines 18, and the file system 12 of FIG. 1. The functions of servers 10 and 38 can be implemented on a single computer or a network of computers. Multilingual application server 38 communicates with the multilingual translation memory database 20 through the intranet 64, the network which is internal to the translation server network 8, shown in FIG. 1. The translatable strings which are stored in translation database 20 may also be processed by third party linguistic analysis utilities 48 which may access the database. The translation memory database 20 is also accessible by the online translators 26 through intranet 64.

Figure 3:
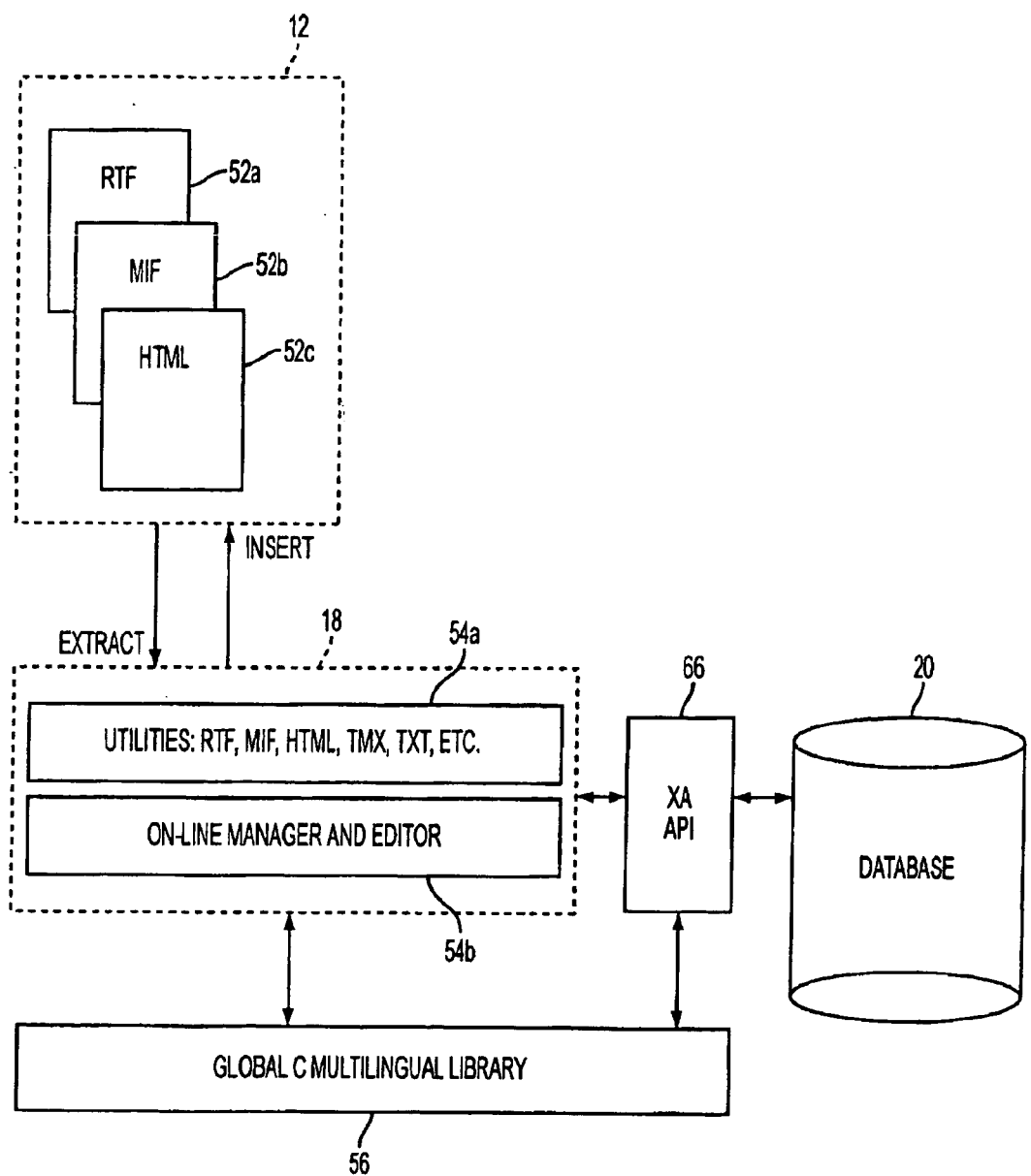
FIG. 3 is a block diagram illustrating the translation and management architecture of the present invention.

Turning to FIG. 3, such shows the software architecture for accomplishing the translation of input documents. The files stored in the file system storage 12 may be in any of a plurality of different text documents or graphics formats 52*a*, 52*b*, 52*c*. The localization engines 18 utilize utilities 54*a* to interpret those differently formatted documents, and utilizes on-line manager and editor routines 54*b* for processing those documents. The processing of those documents is done in cooperation with an open system multilingual library 56 and the localization engines 18 communicate with the translation database 20 through an application program interface (API) 66 utilizing an open protocol.

Figure 4:
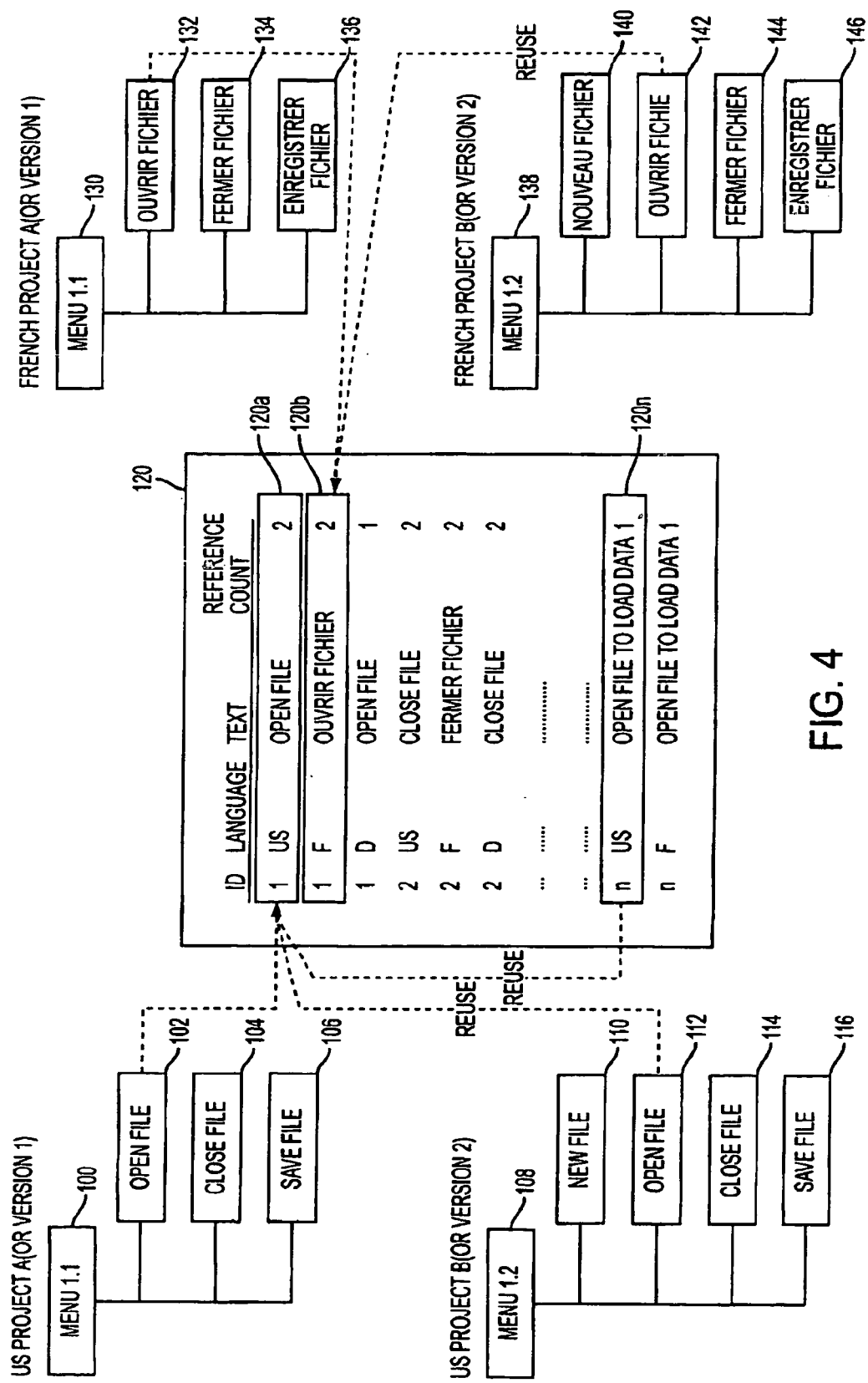
FIG. 4 is an illustration of the translation memory architecture of the present invention.

Referring to FIG. 4, such illustrates the translation memory architecture. Translation database 20 stores multiple projects 100, 108 which each include respective strings 102, 104, 106 and 110, 112, 114, 116 to be translated. In the illustration, menus for use in a computer program are illustrated. The translated projects 130 and 138 are also stored in memory with the respective translated (French) strings 132, 134, 136 and 140, 142, 144, 146. A database text table 120 is provided which includes pointers for finding the text in translation database 20. Each entry 120*a*–120*n* in the table 120 includes an ID which refers to the particular project, the language of the text, the text itself and a reference count, which indicates the number of different projects utilizing that same text. Thus, the text "open file" 102 and 112 is referred to as a single entry 120*a* in the table 120. Similarly, the translated French text "ouvrir fichier" 132 and 142 are similarly referred to in the single database entry 120*b*.

Where text incorporates a translated term in some other project n, such is considered a subset of the preceding entry. Thus, the text "open file" is considered a subset of the text "open file to load data" and thus the entry 120n will include a reference pointing to the Table entry 120a. By that arrangement, a portion of the string "open file to load data" can be obtained from the previously translated string "open file". Thus, the translation process is simplified and the database overhead is reduced. By maintenance of the translation database 20, the automated translation system becomes more robust the more it is used, as every string which has been previously translated need not be duplicated by human translators. The translation database 20 can therefore be shared by multiple customers and vendors through the Internet. Localization engines 18 search the database for past translations. Translations which match, or just partially match are identified and added to the file that is provided to the translation vendor 4, 26.

The advantages provided by the system can be clearly seen when one considers a class of customers who would utilize the system. For instance, Web site owners who wish to duplicate their Web sites in multiple languages are customers who would benefit from system 1000. The text found in most Web sites is between 50% and 60% redundant. Therefore, at least 50% to 60% of the time and money required for translation would be saved, as the redundant text strings found in a given HTML file of a web site would be translated automatically, and not require the services of the vendor translator. Thus, over time, users of system 1000 would increasingly benefit by its expanded knowledge database.

Figure 5:
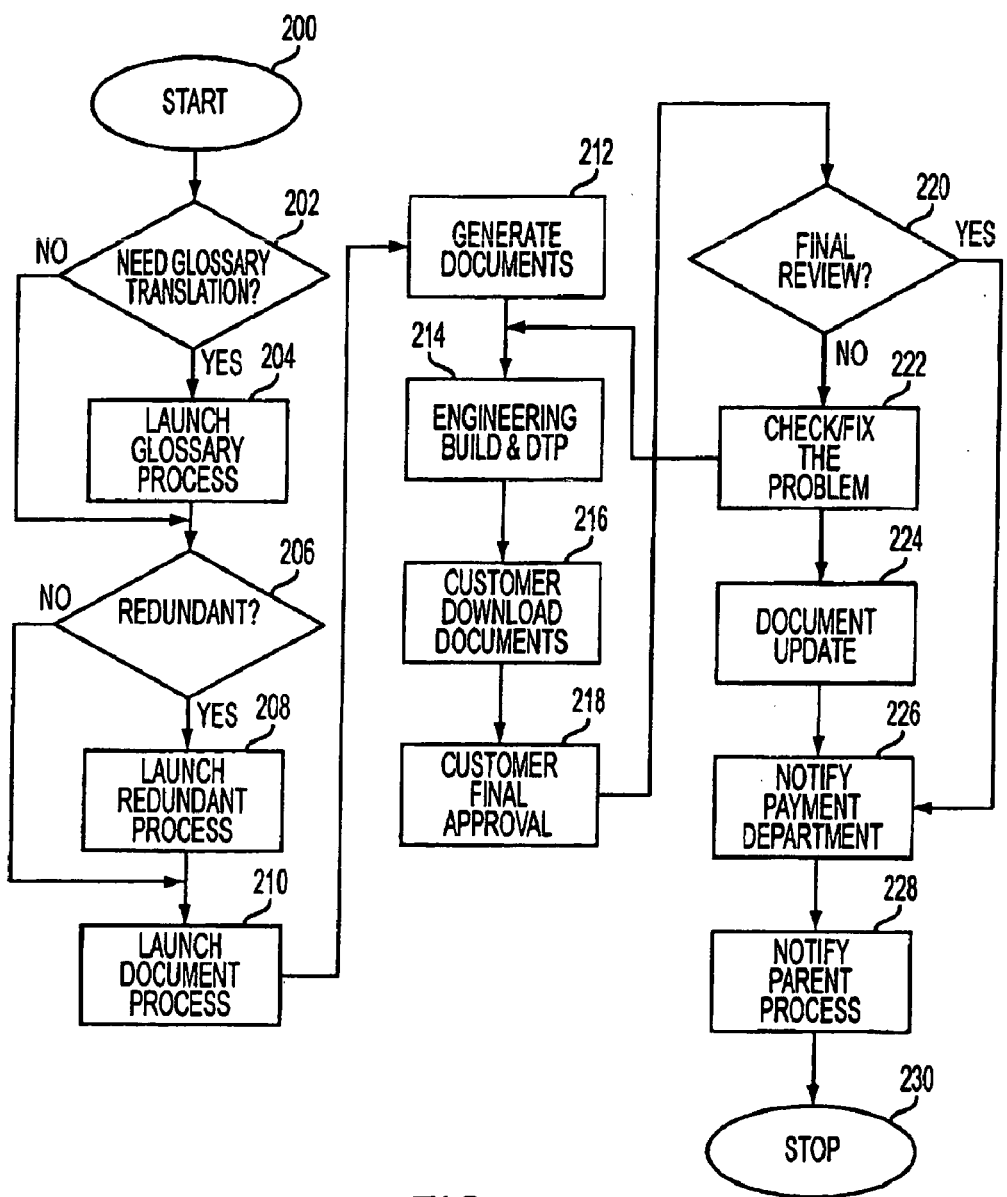
FIG. 5 is a flow chart representing the translation process of the present invention.

An example of a translation process workflow which would be established by the flow designer 24 is shown in FIG. 5. The process starts at 200 and next goes to the decision block 202, wherein it is determined whether a glossary is needed. A glossary is a collection of long phrases found in a document. In some cases, the customer may already have a glossary that is uploaded, in other cases it must be created. Glossaries are particularly useful where there are many translators working on a project. One translator translates the glossary and then after review and approval by the client, or a reviewer contracted by the client, it can be distributed to all the translators. The use of glossaries ensures that common terms are translated consistently across all files of a customer's single project or multiple projects. The instant invention provides for creation of both default and custom glossaries. When a default glossary is created, the strings are extracted automatically, and are therefore project specific. Custom glossaries can be created to standardize terminology across projects, corporate divisions, or entire corporations. The user can create as many glossaries as desired. The glossaries are not used to automatically translate a project, but are given to all translators working on a client's project or projects, to give all the translators the same verbiage for use within their respective translations. The use of the common verbiage of the glossary keeps the consistency at a high level.

If a glossary is needed, the flow passes to block 204 where the glossary generation process is initiated. From block 204, the flow passes to decision block 206 to determine whether there is redundant data. If there is redundant data, the flow passes to block 208 wherein redundant processing is initiated. Thus, the reference count for the text strings are scanned and only one string of a redundant group need be translated. From block 208, the actual document translation process is initiated in block 210 and the translated document is generated in block 212. From block 212, the flow passes to block 214, wherein alterations to the text document are made, such as changes to the font size and format of the document. From block 214, the flow passes to block 216, wherein the customer inspects the document. From there, the flow passes to block 218, wherein the customer's final approval is received. From block 218, the flow passes to decision block 220 where it is determined whether the document has been finally reviewed. If it has, then the flow passes to block 226 wherein the customer is billed. If the final review has not been completed, then the flow passes to block 222 wherein the document is checked, and if problems are found, the flow passes back to block 214 to cycle through the loop again. If there are no problems, or such have been fixed, the flow passes from block 222 to block 224 wherein the document is updated, as required. From block 224, the flow passes to block 226, wherein the customer is billed. From block 226, the flow passes to block 228, to indicate to the parent process, such as the order process shown in FIG. 6 that workflow is complete.

Figure 6:
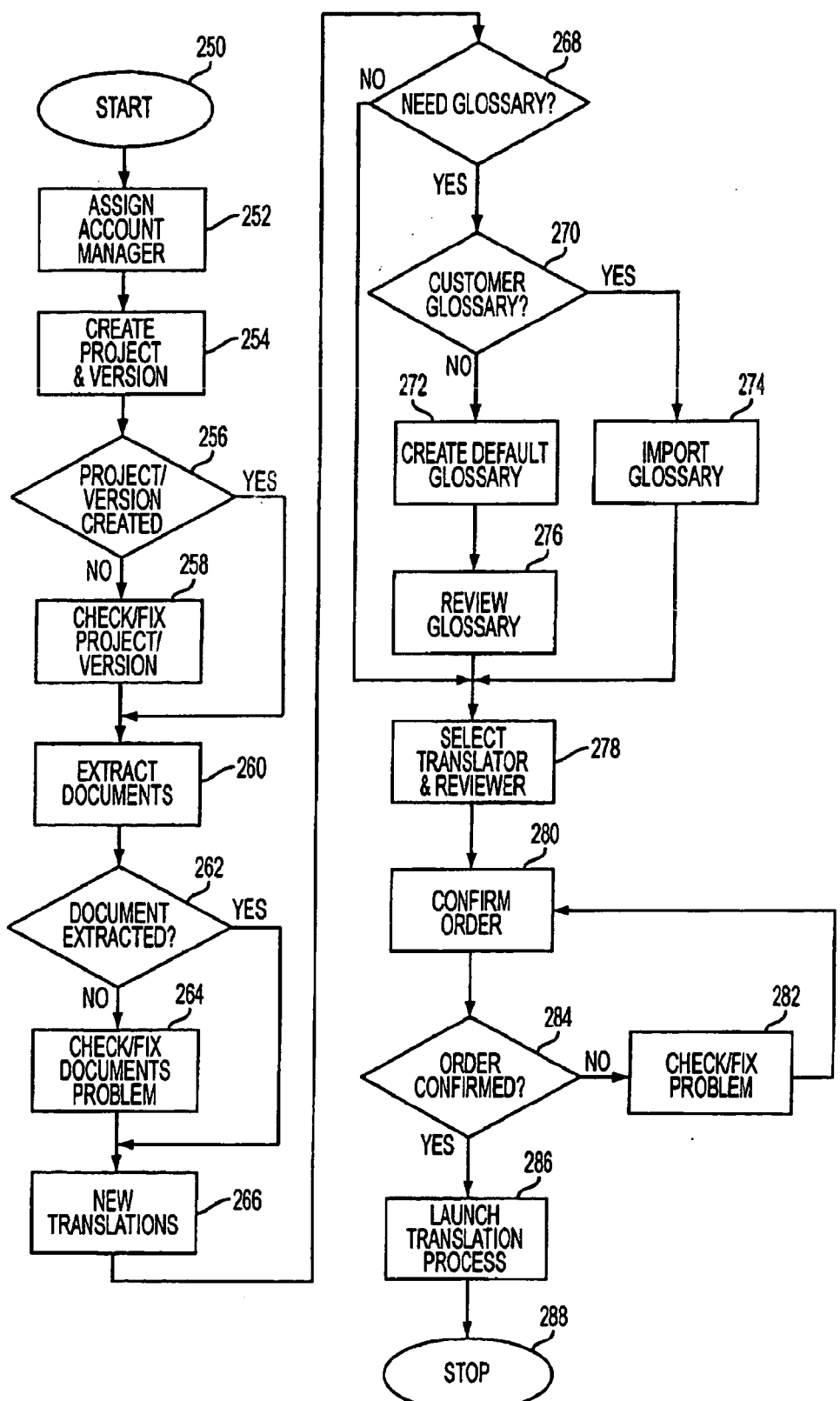
FIG. 6 is a flow chart illustrating the order process of the present invention.

In FIG. 6, the order process is shown. Starting from the start block 250, the flow passes to block 252. In block 252, an account manager is assigned to the project that will be created in block 254. In block 254, the project and version (which language) is created by the customer and can include creation of the workflow design (FIG. 5). From block 254, the flow goes to decision block 256, wherein it is determined whether the project and version are created properly. If they are, the flow passes to block 260, otherwise, the flow passes to block 258, wherein the assigned account manager checks and fixes the project and/or version. From block 258, the flow passes to block 260. In block 260, the application programming interface 66 and the appropriate utility 54A based on the file format of the document are called to extract the translatable strings. From block 260, the flow passes to decision block 262, wherein it is determined whether the strings have been completely extracted from the document. If the strings have been completely extracted, the flow passes to block 266. If they have not, flow passes to block 264, wherein the account manager checks the document and fixes any problems therewith that are preventing the complete extraction of the translatable strings. From block 264, the flow passes to block 266, wherein it is determined how many target languages are to be provided for the client, so the proper number of copies of the original file can be made. From block 266, the flow passes to decision block 268 wherein it is determined whether there is a need for a glossary. If a glossary is not required, flow passes to block 278. If, on the other hand, a glossary is required, the flow passes to decision block 270 wherein it is determined whether the customer has provided a glossary. If the customer has provided a glossary, the flow passes to block 274 where the glossary is imported and then flow passes to block 278. However, if no glossary is provided, the flow passes to block 272 wherein a glossary is created. Subsequent to creation of the glossary, the flow passes to block 276 wherein the glossary is reviewed by the client. From block 276, the flow passes to block 278 wherein the client selects the translator and reviewer (usually two different persons) for each target file. Subsequent to selection of the vendors in block 278, the flow passes to block 280, wherein the customer confirms the order. From block 280, the flow passes to decision block 284, wherein it is determined whether the order has been confirmed. If it has not, the flow passes to block 282 wherein the account manager fixes the problem in obtaining an order confirmation. In some cases, a client may have desired translation of their project into a particular number of target languages, for instance ten, but the final cost for that quantity of translations may result in a quoted cost which exceeds the client's budget. Therefore, the client may then have to scale back the extent of their order or find new vendors offering lower costs. Once the problems are fixed in block 282, the flow passes back to block 280, to repeat the cycle in obtaining order confirmation. After the order has been confirmed, the flow passes from block 284 to block 286 wherein the translation process is initiated. The translation process is the flow diagram of FIG. 5, thus the process of FIG. 6 is the parent process of that disclosed in FIG. 5. Therefore, the notification provided in block 228 of FIG. 5, is provided in block 286 of FIG. 6. From block 286, the process ends at block 288.

Figure 7:
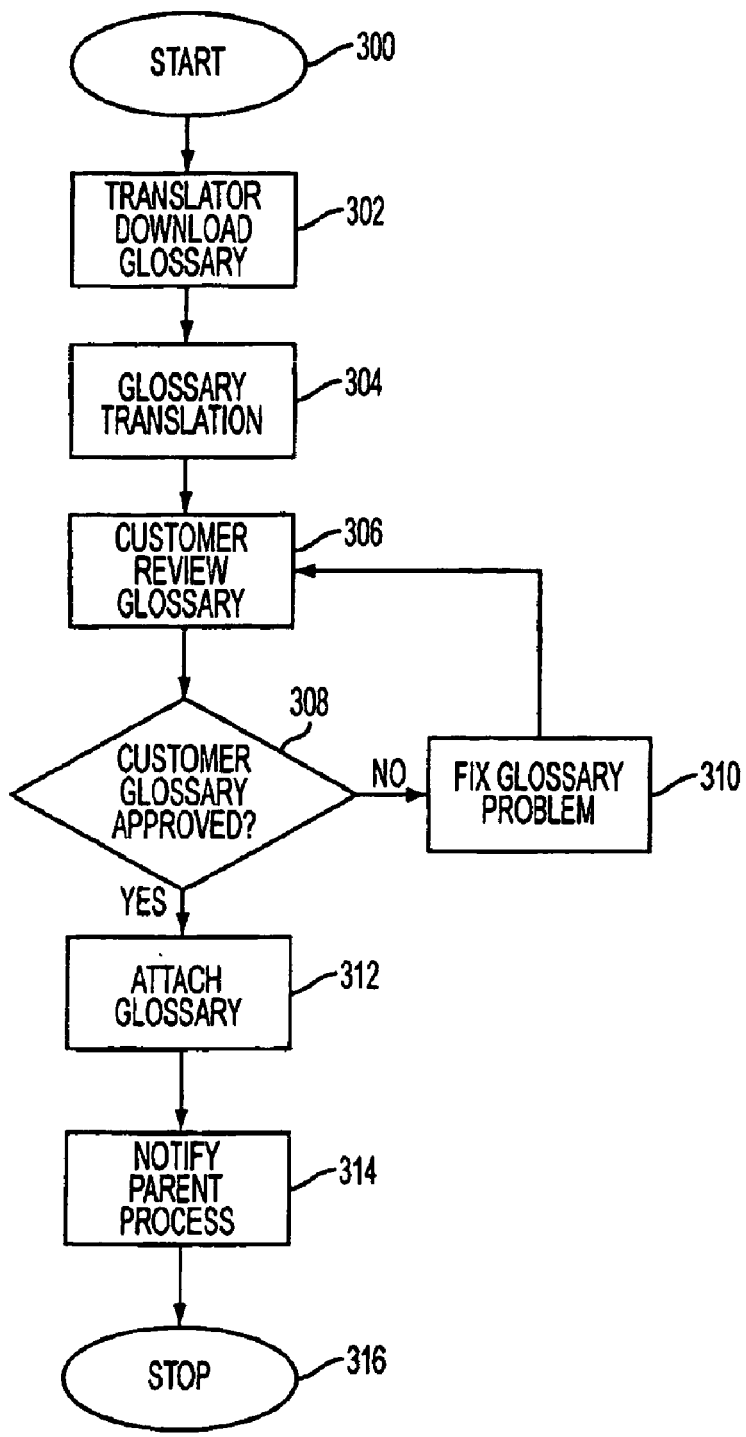
FIG. 7 is a flow diagram illustrating the glossary translation process of the present invention.

FIG. 7 is a flow diagram of the glossary translation process which is initiated in block 204 of FIG. 5. From the start block 300, the flow passes to block 302, wherein a translator 4 downloads the glossary from the Web server 10. The selected vendor 4 is sent an E-mail message informing them that the glossary is ready to be downloaded and provides a hyperlink to the Web page identifying the site from which the glossary may be downloaded via Web based file transfer mechanisms including but not limited to File Transfer Protocol (FTP). From block 302, the flow passes to block 304, wherein the vendor provides the translation of the glossary into the desired target language or languages. From block 304, the flow passes to block 306, wherein the translated glossary is provided to the customer for the customer's review. To insure that the customer agrees with the translation, a loop is provided which begins with decision block 308 where it is determined whether or not the customer has approved the translated glossary. If the customer has not approved it, flow passes to block 310, wherein the vendor fixes the problems identified by the customer. From block 310, the flow passes back to block 306, to permit the customer to review the corrections made by the vendor. Once the customer has approved the glossary, the flow passes to block 312 wherein the translated glossary is attached (identified with) the document to be translated. From block 312, the flow passes to block 314, wherein the parent process, shown in FIG. 5, is notified that the glossary translation process has been completed. From block 314, the process terminates at block 316.

Figure 8:
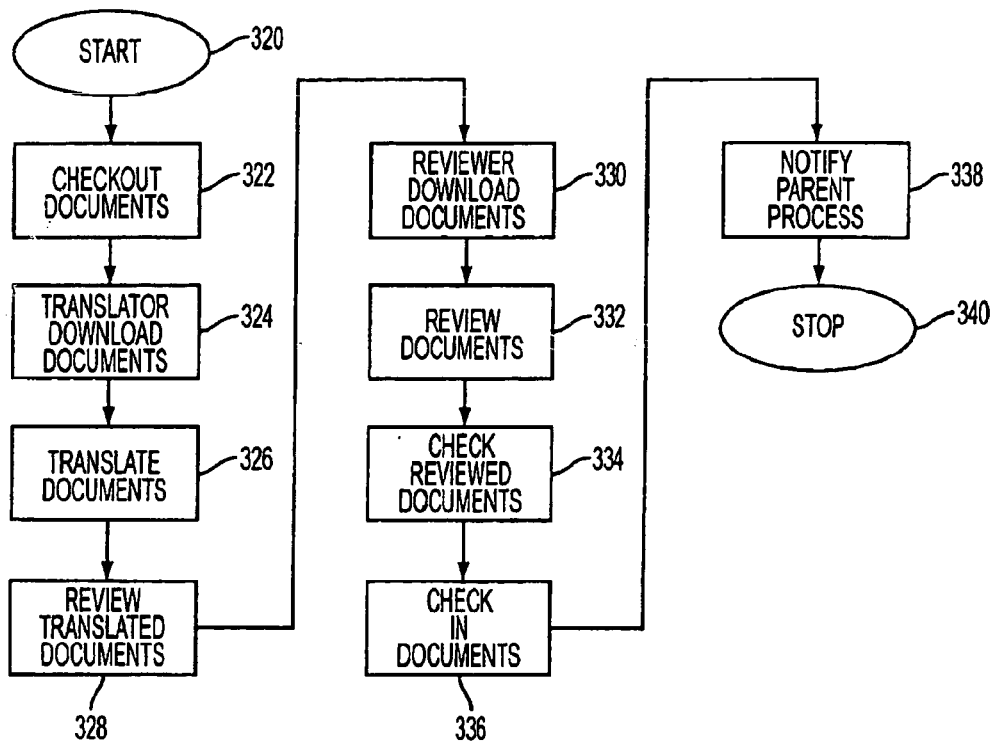
FIG. 8 is a flow chart illustrating the document translation process of the present invention.

Block 210 of FIG. 5 initiates the document translation process. The flow chart for that process is illustrated in FIG. 8. From start block 320 in FIG. 8, the flow passes to block 322 wherein the vendor is sent an E-mail message describing the Web site location of the documents to be translated, so that the vendor can inspect the documents. Flow then passes to block 324, wherein the translator downloads the documents for offline translation. The flow then passes to block 326, wherein the translator performs the translation of the documents. Subsequently, upon completion of the translation, flow passes to block 328, wherein the translated documents are forwarded (uploaded) for review. The reviewer is sent an E-mail indicating that the translation is ready for review. Flow then passes to block 330 wherein the reviewer downloads the translated documents. Subsequent to downloading the documents, the flow passes to block 332 wherein the reviewer performs a review of all of the translated documents and makes any corrections necessary. From block 332, the flow passes to block 334, wherein the reviewed documents, and especially corrections, are checked. Such secondary review, may be carried out by a second reviewer. From block 334, the flow then passes to block 336 wherein the reviewed translated documents are uploaded to the Web server 10. The flow then passes to block 338, wherein the parent process, block 210 of FIG. 5, is notified that the translation process is complete. The process then ends at stop block 340.

Figure 9:
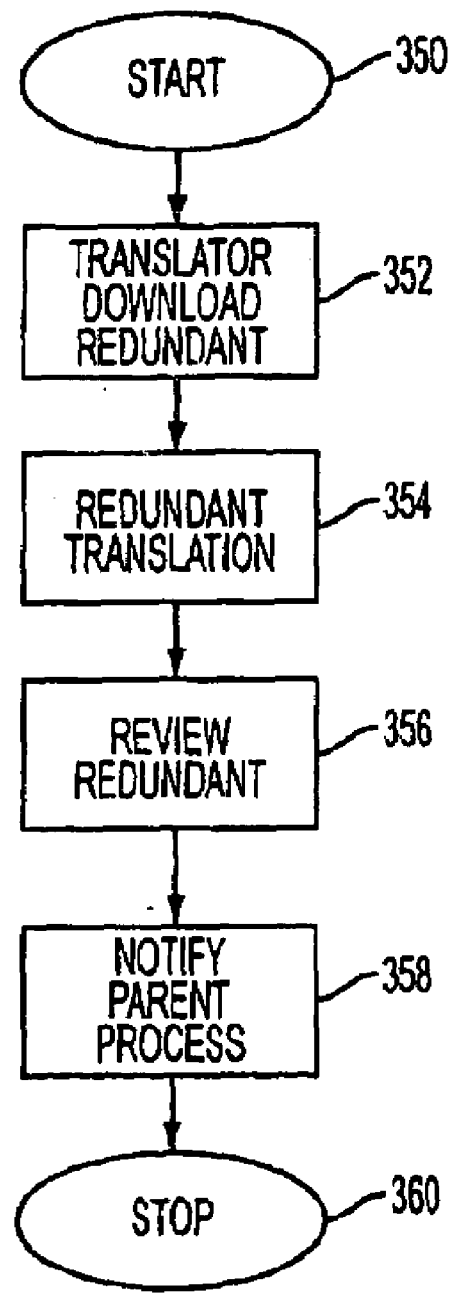
FIG. 9 is a flow chart illustrating the redundant translation process of the present invention.

Turning now to FIG. 9, such shows the redundant string translation process which is initiated by block 208 of FIG. 5. From the start block 350, flow passes to block 352 wherein the redundant strings are downloaded by the translator. From block 352, the flow passes to block 354, wherein the translator translates the strings which have been identified as having multiple re-occurrences in the document. From block 354, the block passes to block 356, wherein a reviewer, usually a separate individual, reviews the translated strings. From block 356, flow passes to block 358, wherein the parent process is notified that the redundant string processing has been completed, such notification being provided in block 208 of FIG. 5. From block 358, the process terminates at block 360.

Figure 10:
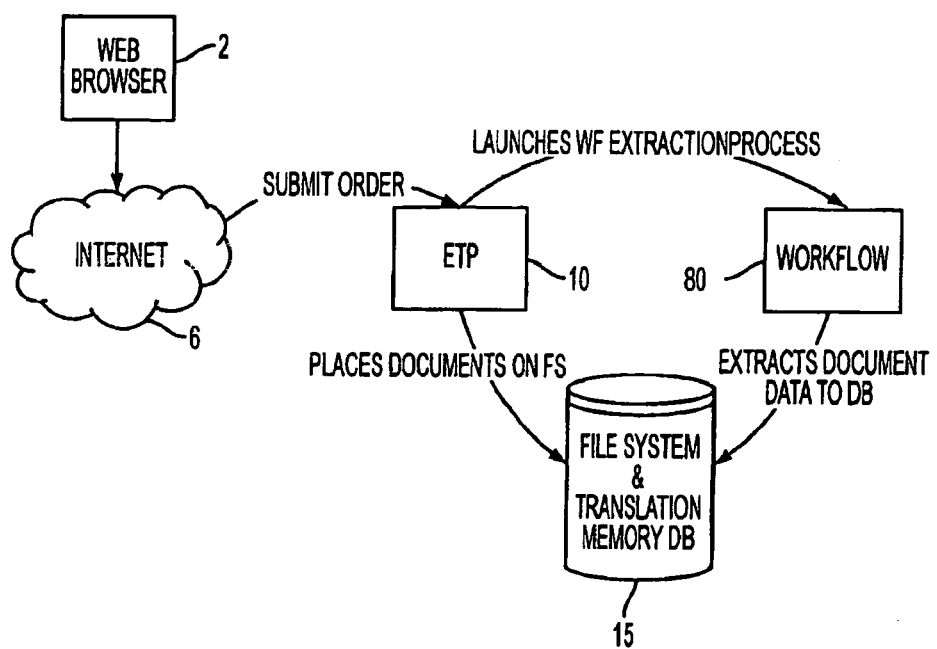
FIG. 10 is an illustration of the order of submission process of the present invention.

Referring now to FIG. 10, such shows the order submission process from another perspective. The customer 2 utilizing a Web browser submits an order to the E-services translation portal embodied in the Web server 10 through the Internet 6. The server 10 stores the documents in a file system disposed within the memory 15. Memory 15 includes file system 12 and translation database 20 shown in FIG. 1. Server 10 also launches the workflow extraction process to extract the translatable strings which are stored in the translation memory database of memory 15, which is carried out by the workflow process 80. The workflow process 80 also includes the reuse of prior translations, where a search is made between the translatable strings of a current project and strings which have previously been processed, to provide a translation when a match is found.

Figure 11:
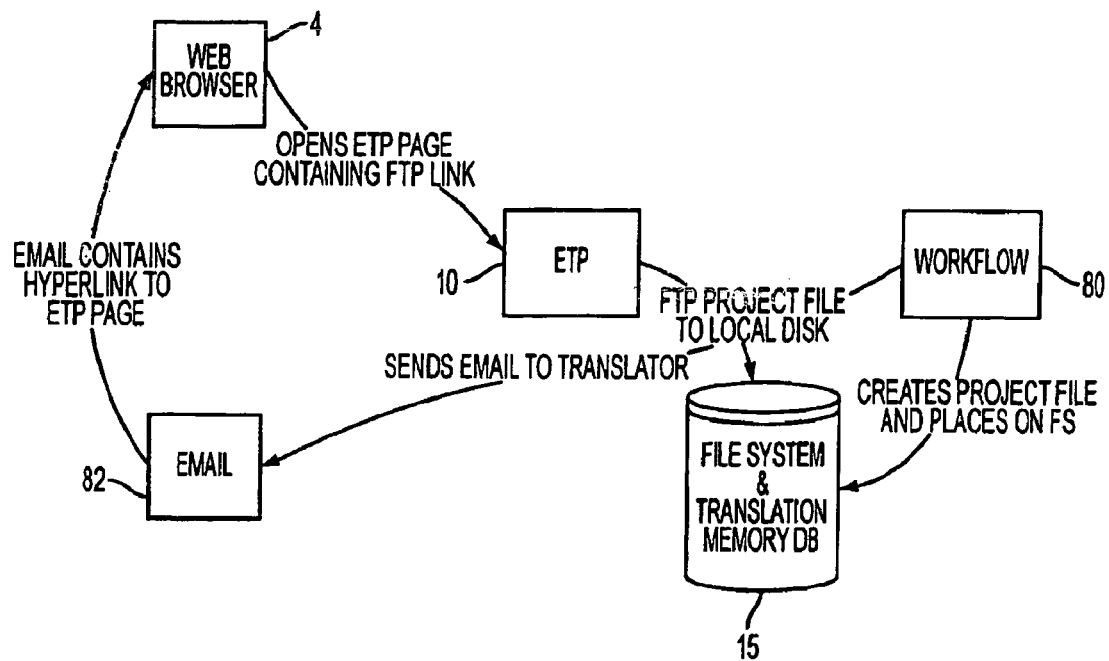
FIG. 11 is an illustration of the translation order assignment process of the present invention.

In FIG. 11, the translation order assignment flow is shown. The workflow process 80 creates a project file and stores that in the file system of memory 15. The workflow process 80 then sends an E-mail 82 to the translator 4. The E-mail contains information about the order, the download location, a hyperlink to the ETP page having a link to the Internet site for downloading the file(s) via Web based file transfer mechanisms including but not limited to File Transfer Protocol (FTP). The translator 4 utilizing the Web browser browses the ETP Web page containing the Web download link to the project file (e.g. via FTP) by utilizing the hyperlink contained in the E-mail 82. Using the browser, the translator 4 downloads the project file from the Web download site and then invokes the local translation software and proceeds to then perform the translation task.

Figure 12:
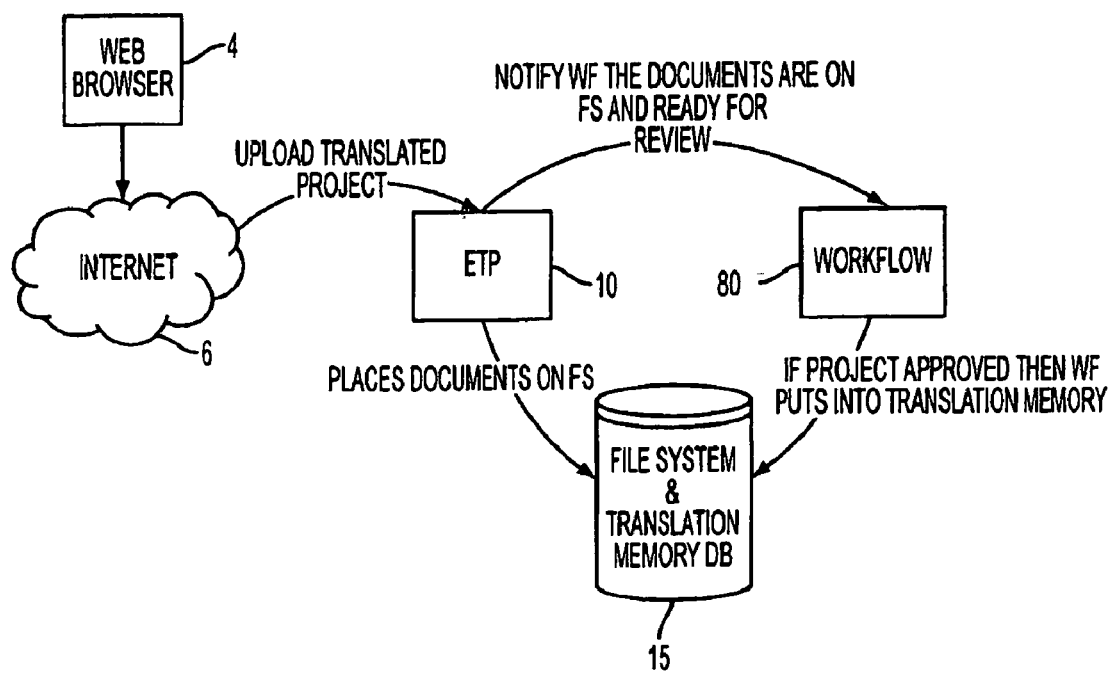
FIG. 12 is an illustration of the order completion flow of the present invention.

Upon completion of the translation task, the translator then uploads the translated document, which process is illustrated in FIG. 12. The translator 4 utilizing a Web browser uploads the translated project through the Internet 6 to the ETP server 10. The server 10 saves the project to the file system in memory 15 and notifies the workflow process 80 that the files are ready. The workflow process 80 handles the flow from reviewers to accept or reject the translation. If the reviewer accepts the project files then the workflow process 80 will store the translated document in the translation memory database, within memory 15. Finally, the translated files are provided to the customer. In order to complete that process, the workflow process 80 sends an E-mail to the customer which contains information about the order, the download location for the translated documents and a hyperlink to the ETP page with a Web download link to the project file (translated documents) via Web based file transfer mechanisms including but not limited to File Transfer Protocol (FTP). A customer, utilizing their browser, employs the hyperlink to access the Web download link to the project, and then utilizing that link, downloads the translated file.

Figure 13:
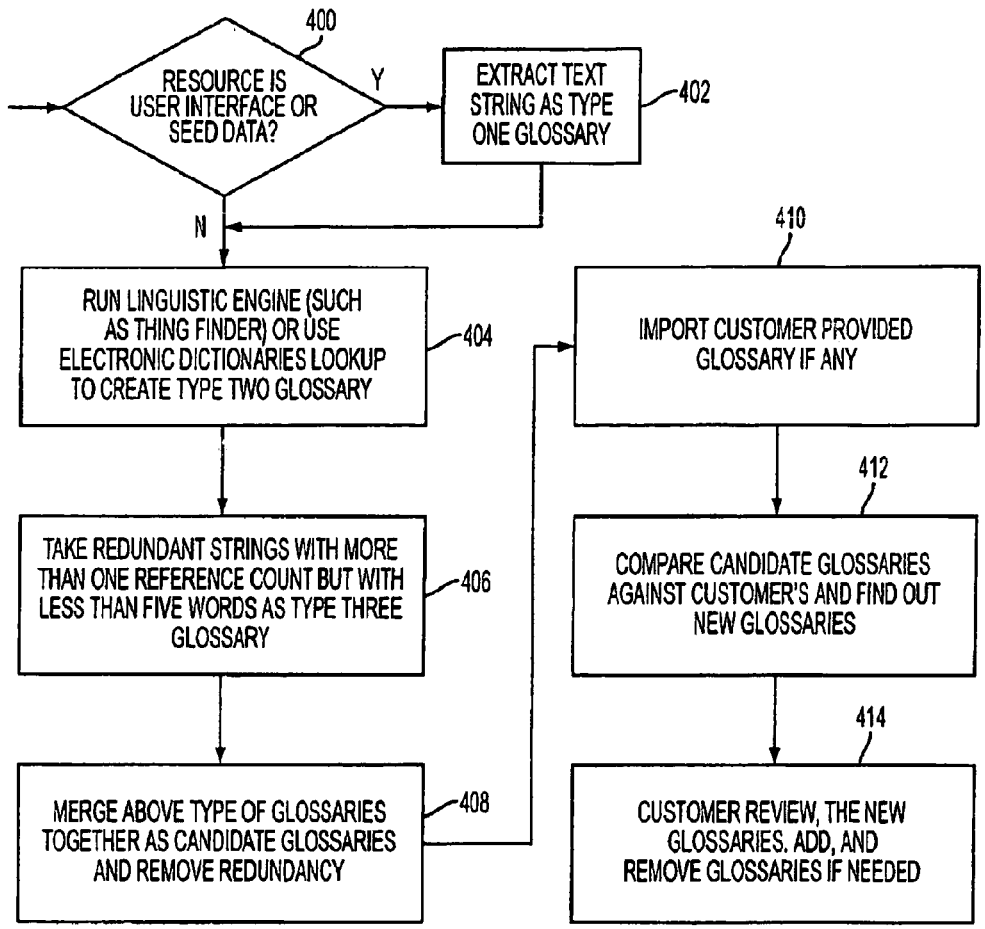
FIG. 13 is a flow chart illustrating the glossary creation process.

The process for creating a default glossary, block 272 of FIG. 6, is shown in FIG. 13. In FIG. 13, the flow starts with a decision block 400 wherein it is determined whether a user interface and thus texts included in the user interface exists or whether there is seed data. Seed data is a list of terms which come with initial software installation or are related to and are usually peculiar to a particular industry. If there is text embedded in a user interface—or seed data, the flow passes to block 402 wherein text strings are extracted from that data or user interface to create what is termed a type 1 glossary. If no user interface or seed data is provided, or subsequent to creating the type 1 glossary in block 402, the flow passes to block 404 wherein a linguistic engine, such as use of an electronic dictionary is used to try and match up long phrases and create a type 2 glossary. From block 404, the flow passes to block 406, wherein redundant strings, strings with more than one reference count and having less than five words are further identified as a type 3 glossary. From block 406, the flow passes to block 408, wherein the three types of glossaries are merged together and redundancies removed. From block 408, the block passes to block 410 where a customer glossary, if provided, is imported into the system.

Flow then passes to block 412, wherein the merged glossary is compared against the customer's glossary to find any conflicts. If conflicts are found, the flow passes to block 414, wherein the customer is requested to review the conflicts and make additions or corrections to the generated glossary. Flow, of course, would then pass back to the parent process.

Figure 14:
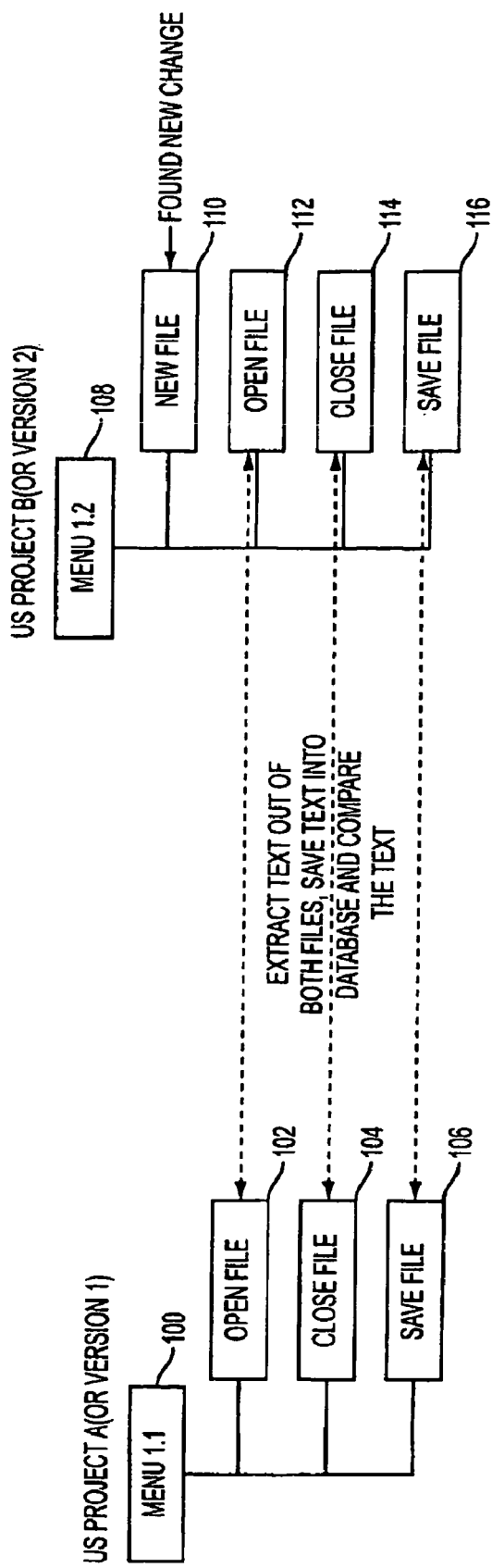
FIG. 14 is an illustration of the text comparison process of the present invention.

As previously discussed, the translation database of the present invention provides great efficiencies in reducing the translation work load required of vendors. As an example, FIG. 14 is provided to illustrate the comparison which is carried out utilizing the translation database. Thus, when a new project 108, having translatable strings 110, 112, 114 and 116, to be translated is entered into the system, it is compared with prior projects that have been provided. The match need not be exact, so that another project having the same or similar strings may be found. The comparison may then identify a prior project 100 having strings 102, 104 and 106 as being identified as being a close match. The difference between the project 100 and the new project 108 is a single string 110, thus the translation that was utilized for project 100 may be utilized again for project 108, with only the string 110 remaining to be translated. By that process, the translation workload which must be contracted out is minimized. In addition to the project level matching, system 1000 performs the translatable string level searching to further reduce the manual translation workload.

Although this invention has been described in conjunction with specific forms and embodiments thereof, it will be appreciated that various modifications other than those discussed above may be resorted to without departing from the spirit or scope of the invention. For example, equivalent elements may be substituted for those especially shown and described, certain features may be used independently of other features, and in certain cases, particular locations of elements may be reversed or interposed, all without departing from the spirit or scope of the invention as defined in the appended Claims.

What is claimed is:

1. A system for translating data, comprising:
a source of data to be translated;
a network connected to said source of data;
a translation source connected to said network; and
portal means connected to said network for retrieving said data to be translated, said portal means including:
a storage memory for storing previous data strings to be translated and corresponding previously translated data strings;
a processor for comparing a portion of the data to be translated to the previously stored data in the storage memory to identify a plurality of matching corresponding previously translated data strings and selecting one of the matching corresponding previously translated data strings from the plurality of matching corresponding previously translated data strings based on predetermined criteria;
means for partially translating the data to be translated based on the selected one of the matching corresponding previously translated data strings; and
means for transmitting partially translated data to said translation source for completing translation of said data,
wherein selecting one of the matching corresponding previously translated data strings from the plurality of matching corresponding previously translated data strings comprises selecting a most frequently used matching corresponding previously translated data string.

2. The system as recited in claim 1 wherein the portal means further includes means for receiving a completed translation from said translation source and transmission thereof to said source of data.

3. The system as recited in claim 2 wherein said means for receiving includes means for transmitting an E-mail message to said source of data identifying a network link to an address from which said completed translation can be downloaded.

4. The system as recited in claim 1 wherein said means for transmitting said partially translated includes means for transmitting an E-mail message to said translation source identifying a network link to an address from which the partially completed translation can be downloaded.

5. The system as recited in claim 1 wherein said means for partially translating further includes means for identifying and extracting redundant strings in said data to be translated for translation separate from other strings therein.

6. A system for translating data, comprising:
a source of data to be translated;
a network connected to said source of data;
a translation source connected to said network; and
portal means connected to said network for retrieving said data to be translated, said portal means including:
a storage memory for storing previous data strings to be translated and corresponding previously translated data strings;
a processor for comparing a portion of the data to be translated to the previously stored data in the storage memory to identify a plurality of matching corresponding previously translated data strings and selecting one of the matching corresponding previously translated data strings based on predetermined criteria;
means for partially translating the data to be translated based on the selected one of the matching corresponding previously translated data strings; and
means for transmitting partially translated data to said translation source for completing translation of said data,
wherein selecting one of the matching corresponding previously translated data strings from the plurality of matching corresponding previously translated data strings comprises selecting a most recently used matching corresponding previously translated data string.

7. The system as recited in claim 6 wherein the storage memory further stores the data to be translated.

8. The system as recited in claim 7 wherein said means for partially translating further includes means for establishing and translating a glossary for said data to be translated.

9. The system as recited in claim 8 wherein said means for establishing and translating a glossary includes means for combining translated glossaries from multiple sources.

10. A system for translating data, comprising:
   a source of data to be translated provided by a user;
   a network connected to said source of data;
   a plurality of translation sources connected to said network; and,
   portal means connected to said network for retrieving said data to be translated, said portal means including:
   (a) means for translating a portion of the data to be translated,
   (b) means for collecting translation costs from said plurality of translation sources, the translation costs being based on a size of an untranslated portion of data to be translated,
   (c) means for facilitating the user's selection of at least one of said plurality of translation sources, and
   (d) means for transmitting said at least partially translated data to said selected translation source for completing translation of said data.

11. The system as recited in claim 10 where said portal means further includes means for transferring a completed translation of said data to a second one of said plurality of translation sources for checking accuracy thereof.

12. The system as recited in claim 10 where said portal means further includes a file storage memory for storing said data to be translated.

13. The system as recited in claim 12 where said portal means further includes a database for storing therein previously entered data to be translated associated with prior translations thereof.

14. The system as recited in claim 13 where said means for at least partially translating includes means for comparing said data to be translated with said previously entered data to be translated and associating a corresponding prior translation with said data to be translated responsive to a match substantially being found.

15. The system as recited in claim 10 where said portal means further includes means for receiving a completed translation from said second translation source and transmission thereof to the user.

16. The system as recited in claim 15 where said means for receiving includes means for transmitting an E-mail message to said source of data identifying a network link to an address from which said completed translation can be downloaded.

17. The system as recited in claim 10 where said means for transmitting said at least partially translated data includes means for transmitting an E-mail message to said selected translation source identifying a network link to an address from which said at least partially completed translation can be downloaded.

18. A system for translating data transmitted electronically through a global computer network, comprising:
   at least one user terminal coupled to the global computer network for transmitting and receiving user related data therethrough;
   at least one vendor terminal coupled to the global computer network for transmitting and receiving vendor related data therethrough;
   a first computer coupled to the global computer network for exchanging user related data with said at least one user terminal and vendor related data with said at least one vendor terminal through the global computer network;
   a file storage memory coupled to said first computer for storing user related current document data representing documents to be translated transmitted from said at least one user terminal;
   a second computer coupled to said first computer and said file storage memory for at least partially translating said current document data; and,
   a database of previously entered document data and associated translated document data coupled to said second computer, said second computer comparing said current document data with said previously entered document data to match said current document data with a plurality of corresponding translated document data in said database and to select one of the corresponding translated document data of the plurality of corresponding translated document data based on one of a most frequently used data and a most recently used data to form said at least partial translation of said current document data, said at least partial translation being sent to said first computer and transmitted therefrom to said at least one vendor terminal for completing translation of said current document data and uploading said completed translation to said first computer, said first computer including means for transmitting said completed translation to said at least one user terminal and said second computer, said second computer including means for adding said current document data and said completed translation to said database.

* * * * *

UNITED STATES PATENT AND TRADEMARK OFFICE
CERTIFICATE OF CORRECTION

| | | |
|---|---|---|
| PATENT NO. | : 7,110,938 B1 | Page 1 of 1 |
| APPLICATION NO. | : 09/662758 | |
| DATED | : September 19, 2006 | |
| INVENTOR(S) | : Shang-Che Cheng et al. | |

It is certified that error appears in the above-identified patent and that said Letters Patent is hereby corrected as shown below:

On the Title page, item [63] insert the following:

This application claims the priority benefit of U.S. provisional patent application number 60/154,434 filed on September 17, 1999, the disclosure of which is incorporated by reference herein in its entirety.

Signed and Sealed this
Seventeenth Day of January, 2012

David J. Kappos
*Director of the United States Patent and Trademark Office*